United States Patent
Shugg

(10) Patent No.: US 7,608,050 B2
(45) Date of Patent: Oct. 27, 2009

(54) MOTION DETECTOR FOR A MOBILE DEVICE

(75) Inventor: Christopher John Shugg, Apex, NC (US)

(73) Assignee: Telefonaktiebolaget LM Ericsson (publ), Lund (SE)

(*) Notice: Subject to any disclaimer, the term of this patent is extended or adjusted under 35 U.S.C. 154(b) by 146 days.

(21) Appl. No.: 11/440,878

(22) Filed: May 25, 2006

(65) Prior Publication Data

US 2007/0276295 A1    Nov. 29, 2007

(51) Int. Cl.
  A61B 5/103    (2006.01)
  A61B 5/00    (2006.01)
  G01C 22/00    (2006.01)

(52) U.S. Cl. .................. 600/595; 600/300; 600/587; 235/105

(58) Field of Classification Search .......... 600/587, 600/592, 595; 235/105
  See application file for complete search history.

(56) References Cited

U.S. PATENT DOCUMENTS

| | | | |
|---|---|---|---|
| 6,545,446 B2 * | 4/2003 | Isomichi et al. | 320/128 |
| 6,633,231 B1 * | 10/2003 | Okamoto et al. | 340/539.11 |
| 6,790,178 B1 * | 9/2004 | Mault et al. | 600/300 |
| 2005/0095498 A1 * | 5/2005 | Silverman | 429/61 |
| 2006/0217231 A1 * | 9/2006 | Parks et al. | 482/3 |

FOREIGN PATENT DOCUMENTS

| | | |
|---|---|---|
| JP | 2003 004475 | 1/2003 |
| JP | 2003 156361 | 5/2003 |

OTHER PUBLICATIONS

PCT International Search Report, International Application No. PCT/US2007/060977, Mailed: Jun. 13, 2007.

* cited by examiner

*Primary Examiner*—Max Hindenburg
*Assistant Examiner*—John Pani
(74) *Attorney, Agent, or Firm*—Coats & Bennett, P.L.L.C.

(57) ABSTRACT

A portable electronic device comprises a motion sensor to detect motion and to generate motion data, and an activity monitor to detect user activity based on said motion data. A power detection circuit detects connection of said portable electronic device to an external supply power. A control circuit monitors the output signal from the detection circuit and prevents activity detection by said activity monitor while said portable electronic device is connected to said power supply.

20 Claims, 5 Drawing Sheets

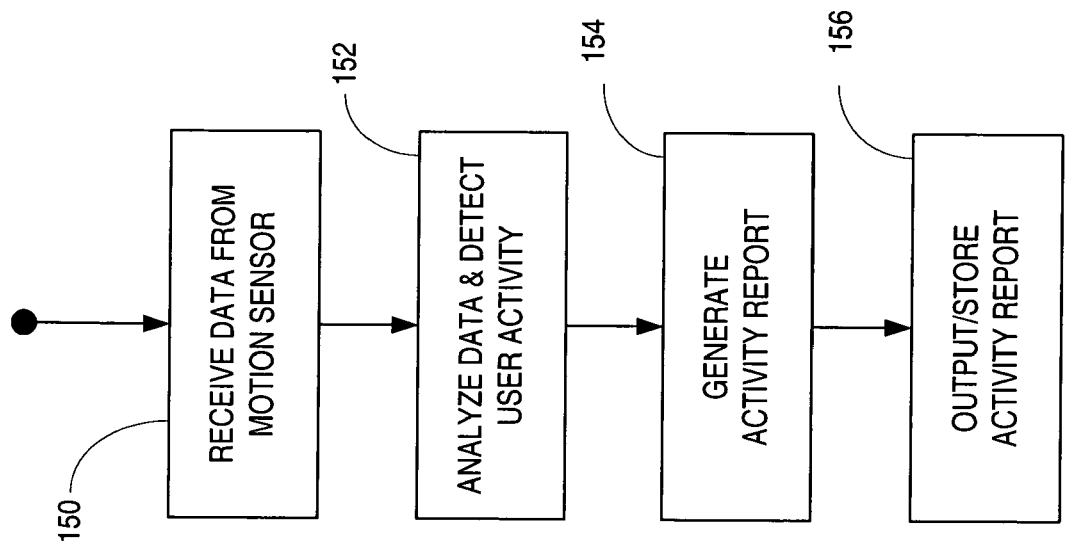

MOTION DETECTOR FOR A MOBILE DEVICE

BACKGROUND

The present invention relates generally to a portable electronic device with an integrated motion sensor, such as a pedometer or accelerometer.

Pedometers are relatively simply devices that count the number of steps taken by a person. Pedometers are typically worn on the hip while a person walks. Some pedometers may compute the distance traveled and/or the number of calories burned while a person is walking. Pedometers promote healthy living by enabling consumers to keep track of the amount of exercise.

It is not uncommon for health-minded consumers who use pedometers to also carry one or more portable electronic devices, such as a cellular telephone, personal digital assistant, and/or audio player. Such devices may also be carried by a person while walking. Thus, a portable electronic device normally carried by the user combined with a pedometer or other activity detector would be convenient for consumers. For example, a consumer who normally carries a cell phone may find it convenient if the cell phone included a pedometer.

A potential problem arises when a portable electronic device including a pedometer is carried with a person while the person is riding in a vehicle. When the user is riding in a vehicle, the motion and/or acceleration of the vehicle may induce the pedometer to count false steps.

SUMMARY

The present invention relates to a portable electronic device having a motion sensor for detecting motion or other activity detector. The motion sensor or activity detector may, for example, comprise a pedometer for counting steps taken by the user while walking. When the portable electronic device is connected to a power source, the motion sensor may be disabled to prevent detection of false steps. The motion sensor can be disabled by turning off power to the motion sensor. Alternatively, the motion sensor may be effectively disabled by commanding motion detection algorithms to ignore the output of the motion sensor while the portable electronic device is coupled to a power source.

BRIEF DESCRIPTION OF THE DRAWINGS

FIG. 5 is a flow chart illustrating an exemplary process implemented by an activity monitor.

DETAILED DESCRIPTION

Figure 1:
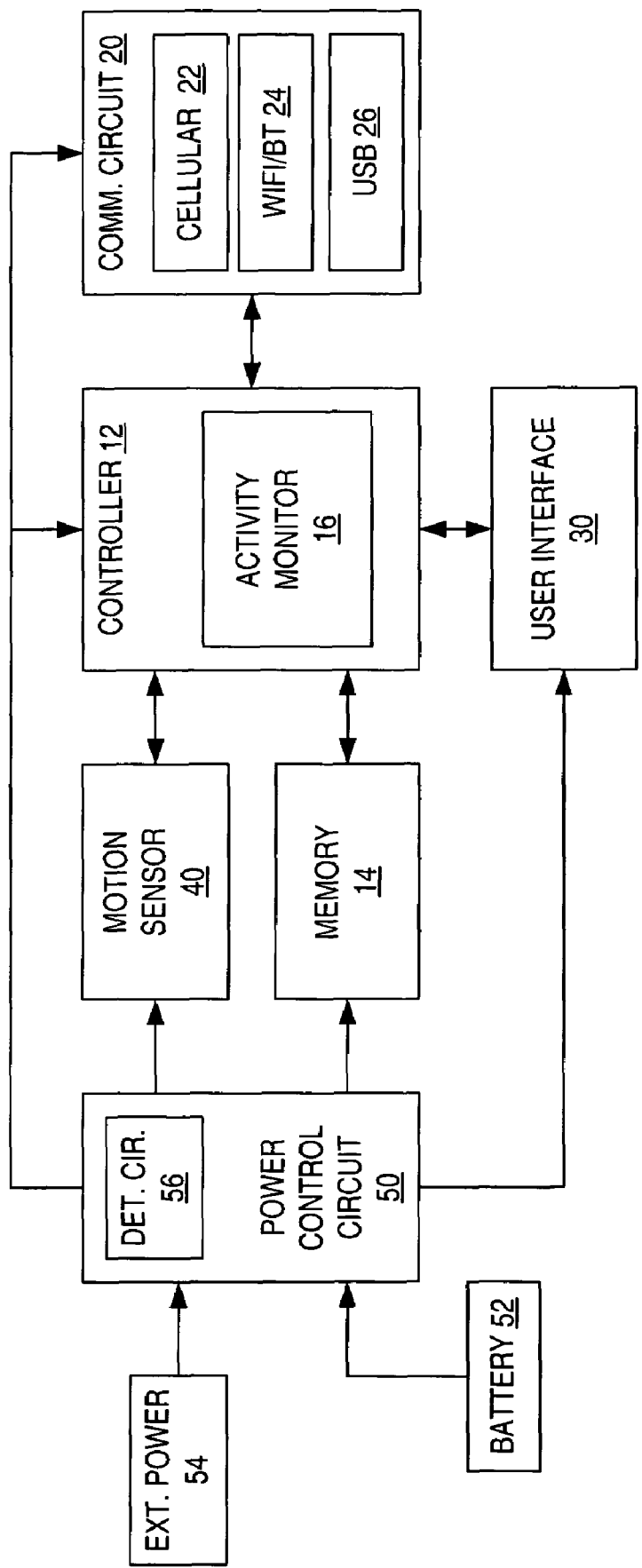
FIG. 1 is a functional block diagram of a portable electronic device according to one exemplary embodiment.

FIG. 1 illustrates a portable electronic device 10 according to one exemplary embodiment. The exemplary embodiment comprises a cellular telephone or personal digital assistant (PDA) device. The present invention may also be embodied in other types of portable electronic devices including, without limitation, audio players, video players, pagers, digital cameras, audio and video recorders, etc. The portable electronic device 10 in the exemplary embodiment comprises a controller 12 to control operation of the device 10, memory 14 to store data and programs needed for operation, a communication circuit 20 for communicating with external devices, a user interface 30, a motion sensor 40 or other activity detector to detect the activity of the user, and a power control circuit 50.

The controller 12 may comprise one or more processors, hardware, firmware, or any combination thereof. The controller 12 controls the overall operation of the portable electronic device 10 according to programs stored in memory 14. Memory 14 includes both read-only memory (ROM) and random access memory (RAM). Programs needed for operation are stored in permanent memory, such as an erasable programmable read-only memory (EPROM) or flash memory. Random access memory may be used to store temporary data. The controller 12 executes a program referred to herein as an activity monitor 16 that monitors the physical activity of the user. The activity monitor 16 analyzes motion data from the motion sensor 40 as hereinafter described to detect physical activity and provides output to the user. For example, the activity monitor 16 may function as a pedometer to count the number of steps taken by the user while walking or running. The activity monitor 16 may also calculate the distance traveled while walking or running based on the number of steps taken, and the number of calories burned while walking or running.

The communication circuit 20 may comprise any type of communication interface for communicating with external devices. In the exemplary embodiment, the communication circuit 20 includes a cellular transceiver 22 for communicating with a cellular network, a short-range wireless interface 24, and a wired interface 26. The cellular transceiver 22 may use any communication standard, such as the Global System for Mobile Communications (GSM), cdma200, WCDMA, or OFDM. The short-range wireless interface 24 may comprise a short-range radio interface such as a WIFI or Bluetooth® interface, or may comprise an infrared interface. The wired interface 26 may comprise, for example, a serial interface such as a Universal Serial Bus (USB) interface.

Figure 2:
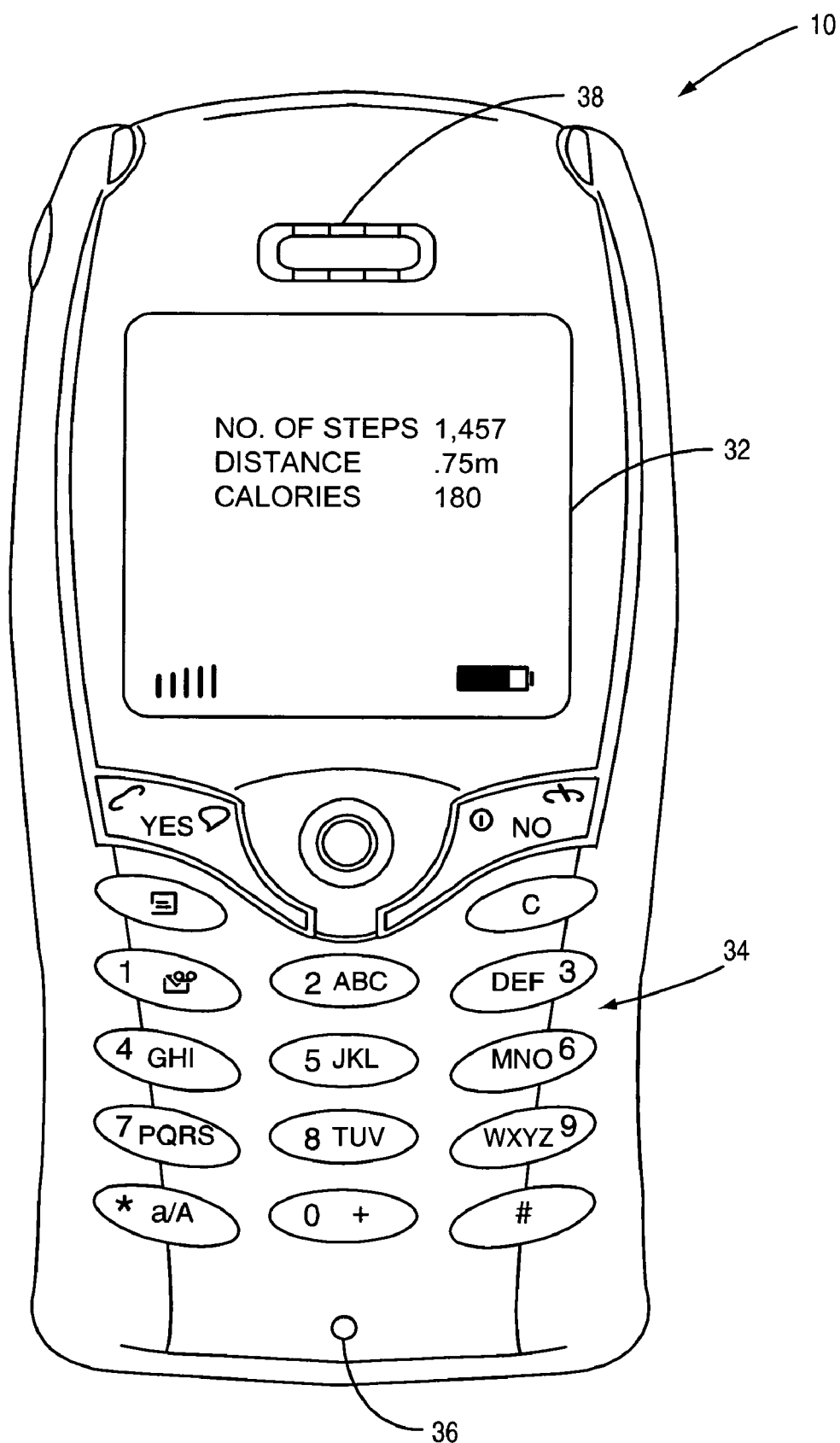
FIG. 2 illustrates an exemplary portable electronic device for detecting connection to an external power source.

The user interface 30 enables a user to interact with the portable electronic device 10. The user interface 30 comprises a display 32, one or more input devices 34, a microphone 36, and speaker 38 (FIG. 2). Display 32 may comprise, for example, a liquid crystal display. The display 32 is used to output information for viewing by the user. The display 32 could be a touchscreen display that also functions as an input device. In the present invention, the activity monitor 16 outputs information indicative of user activity to the display 32. The input devices 34 enable the user to enter data and commands and to control operation of the device 10. In the illustrated embodiment, the input devices 34 include a numeric keypad, a navigation control and several function keys. Other types of input devices that may be used include touch pads, scrolling devices and pointing devices.

The motion sensor 40 may comprise, for example, an accelerometer. The motion data generated by the motion sensor 40 is supplied to the activity monitor 16. The activity monitor 16 analyzes the motion data output by the motion sensor 40 to detect physical activity of the user, such as walking or running. The activity monitor 16 may receive input from other sensing devices (not shown), such as a heart rate monitor or blood pressure monitor.

The power control circuit 50 controls power to the other components in the portable electronic device 10. The power control circuit 50 connects to an internal power source such as a battery 52. The power control circuit 50 may also connect to an external power source 54 via a connector (not shown). The power control circuit 50 includes a detection circuit 56 to detect the presence of the external power source 54 and to provide a status signal to the controller 12.

In response to the status signal from the detection circuit 56, the controller 12 can disable the motion sensor 40 and/or activity monitor 16. It can be assumed that the user is not walking or running when the portable electronic device 10 is coupled to a power source. Therefore, the motion sensor 40 and/or activity calculator 16 may be disabled while the portable electronic device 10 is coupled to a power source to prevent detection of false activity, i.e., false steps. For example, when the portable electronic device 10 is connected to a power supply in a vehicle, the vehicle's motion may be falsely detected as activity. Thus, disabling the motion sensor 40 or activity calculator 16 prevents the vehicle's motion from being counted as physical activity.

Figure 3B:
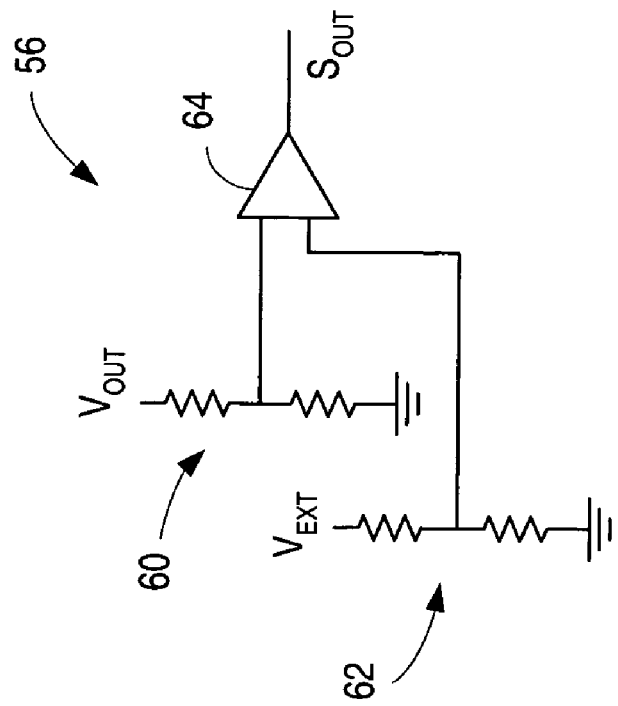
FIGS. 3A-3B illustrate exemplary power detection circuits for detecting connection to an external power source.
Figure 3A:
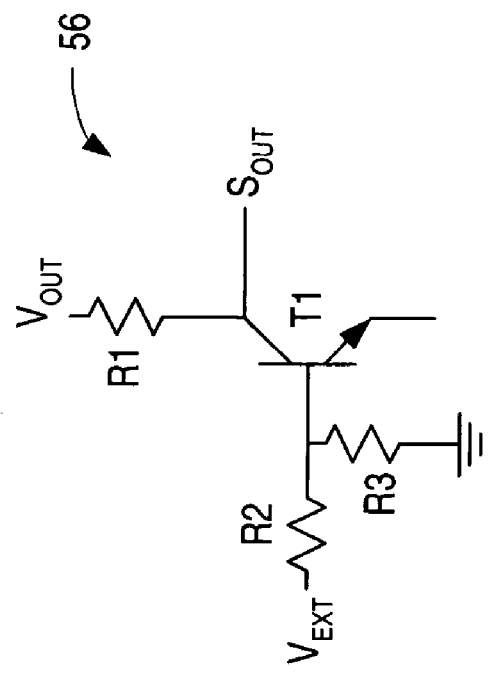

FIG. 3A illustrates an exemplary detection circuit 56 for detecting the presence of an external power source 54. In the embodiment shown in FIG. 3, the detection circuit 24 comprises a transistor circuit. The base of a transistor T1 is coupled to the external power source 54 through resistor R1 when the external power source 54 is present, and to ground through resistor R3. The collector of the transistor T1 is connected through resistor R2 to a regulated voltage $V_{OUT}$ supplied by the power control circuit 50 and to the detector output $S_{OUT}$. When no external power source 54 is present, the transistor is off and the detector output is high. When an external power source 54 is present, the transistor is turned on and the detector output is low. The detector output signal is supplied to the controller 12, which may then disable the motion sensor 40 and/or activity monitor 16. Those skilled in the art will appreciate that the detector output signal could be used to directly control the power to the motion sensor 40.

FIG. 3B illustrates another exemplary detector circuit 56. The detector circuit 56 in this embodiment includes a pair of voltage dividers 60, 62 connected to a comparator 64. The first voltage divider 60 provides a first input signal derived from the regulated voltage $V_{OUT}$. The second voltage divider provides a second input signal derived from $V_{EXT}$. The first and second input signals are applied to respective inputs of the comparator 64. The voltage supply of the comparator 64 is also connected to $V_{OUT}$. The output of the comparator 64 is high or low, depending upon the presence of the external power source 54.

Figure 4:
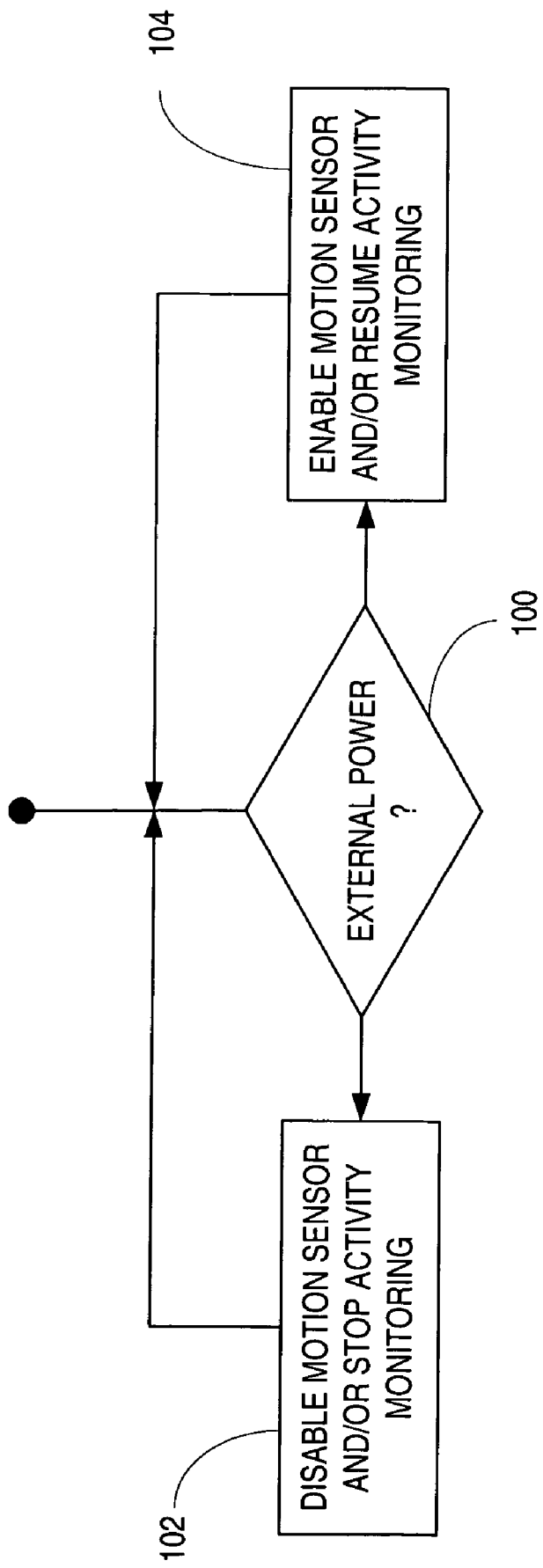
FIG. 4 is a flow chart illustrating exemplary logic for controlling an activity monitor.

FIG. 4 illustrates exemplary logic implemented by the controller 12 for disabling the motion sensor 40 or activity monitor 16 when connected to an external power source 54. The controller 12 continuously or periodically monitors the status signal generated by the detection circuit 56 (block 100). When an external power source 54 is present, the controller 12 may disable the motion sensor 40 by generating a control signal, or alternatively, may command the activity monitor 16 to stop the monitoring process while the electronic device 10 is connected to the external power source 54 (block 102). When the external power source is not present, the controller 12 either enables the motion sensor 40 or instructs the activity monitor 16 to resume the monitoring process (block 104).

FIG. 5 illustrates the functions performed by the activity monitor 16. The activity monitor 16 receives motion data from the motion sensor 40 (block 150). When enabled, the activity monitor 16 processes and analyzes the data provided by the motion sensor 40 to detect physical activity of the user, such as walking or running (block 152). For example, the activity monitor 16 may count the number of steps taken by the user, and the frequency of the user's steps. The activity monitor 16 may use the count and frequency information to determine the distance traveled by the user, the user's speed, and the number of calories burned. The activity monitor generates an activity report (block 154). The activity report may be stored in memory 14, or may be output to the display 32 for viewing by the user (block 156). The activity report may also be stored in a removable memory device and/or transferred to a desktop computer system.

The technique described above for disabling a motion detector 40 and/or activity monitor 16 based on the presence of an external power source 54 can be applied to other types of sensors. For example, a portable electronic device 10 may include a heart rate monitor, blood pressure monitor, temperature sensor, or type of activity sensor. These sensing devices can also be disabled when the portable electronic device 10 is connected to an external power source 54.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A wireless communication device comprising:
   a wireless transceiver;
   a pedometer to detect motion and to generate motion data;
   an activity monitor to detect user activity based on said motion data;
   a power detection circuit to detect connection of said wireless communication device to an external power supply; and
   a control circuit responsive to signals from said power detection circuit to prevent activity detection by said activity monitor while said wireless communication device is connected to said power supply and while said wireless transceiver is operable.

2. The wireless communication device of claim 1 wherein the activity monitor counts steps taken by said user.

3. The wireless communication device of claim 2 wherein the activity monitor is adapted to perform at least one of the following:
   compute a distance walked based on the number of steps taken;
   compute calories burned based on the number of steps taken.

4. The wireless communication device of claim 1 wherein said wireless communication device comprises a wireless telecommunications device with radio transmit and receive capability.

5. The wireless communication device of claim 1 wherein the activity monitor generates an activity report based at least in part on data received from said pedometer.

6. The wireless communication device of claim 4 wherein said wireless communication device is adapted to maintain said radio transmit and receive capability when said activity detection by said activity monitor is prevented in response to said signals from said power detection circuit.

7. The wireless communication device of claim 5 further comprising a display to display the activity report.

8. The wireless communication device of claim 1 wherein the motion detector comprises an accelerometer.

9. The wireless communication device of claim 1 wherein the control circuit prevents activity detection by disabling said pedometer while said wireless communication device is connected to said external power supply.

10. The wireless communication device of claim 1 wherein the control circuit prevents activity detection by pausing said activity monitor while said wireless communication device is connected to said external power supply.

11. In a wireless communication device with a pedometer, an activity monitor, a power detection circuit, and a wireless transceiver, a method comprising:

detecting user activity with the activity monitor based on motion data from the pedometer; detecting using the power detection circuit, connection of the wireless communication device to an external power source; and suspending activity detection of the activity monitor responsive to a signal from the power detection circuit indicating the detection of connection while said wireless communication device is connected to said external power source and while said wireless transceiver remains operable.

12. The method of claim 11 wherein detecting user activity comprises detecting steps taken by said user.

13. The method of claim 12 further comprising computing distance walked based on the number of steps taken.

14. The method of claim 12 further comprising computing calories burned based on the number of steps taken.

15. The method of claim 11 further comprising generating an activity report.

16. The method of claim 15 further comprising storing the activity report in memory.

17. The method of claim 15 further comprising displaying the activity report on a display.

18. The method of claim 11 further comprising both transmitting radio signals from said wireless communication device and receiving radio signals by said wireless communication device while said activity detection is suspended.

19. The method of claim 11 wherein suspending activity detection comprises disabling said pedometer while said wireless communication device is connected to said external power supply.

20. The method of claim 11 wherein suspending activity detection comprises ignoring data produced by said pedometer while said wireless communication device is connected to said external power supply.

* * * * *

UNITED STATES PATENT AND TRADEMARK OFFICE
CERTIFICATE OF CORRECTION

PATENT NO. : 7,608,050 B2
APPLICATION NO. : 11/440878
DATED : October 27, 2009
INVENTOR(S) : Christopher John Shugg It is certified that error appears in the above-identified patent and that said Letters Patent is hereby corrected as shown below:

ON THE TITLE PAGE

Assignee: change "Telefonaktiebolaget L M Ericsson (Publ), Lund (SE)" to "Sony Ericsson Mobile Communications AB"

Signed and Sealed this
Eighth Day of March, 2016

Michelle K. Lee
*Director of the United States Patent and Trademark Office*